United States Patent
Krisher

(10) Patent No.: US 6,318,533 B1
(45) Date of Patent: Nov. 20, 2001

(54) MOTOR VEHICLE WHEEL END ASSEMBLY WITH HUB LOCK

(75) Inventor: James A. Krisher, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 08/904,635

(22) Filed: Aug. 1, 1997

(51) Int. Cl.[7] .............................. B60K 23/08; F16D 11/10
(52) U.S. Cl. ................... 192/69.41; 192/85 V; 180/247; 301/105.1
(58) Field of Search ................... 192/69.4, 69.41, 192/85 V, 82 R, 109 R; 180/247, 259; 301/105.1; 403/1

(56) References Cited

U.S. PATENT DOCUMENTS

| | | | |
|---|---|---|---|
| 4,273,460 | * 6/1981 | Ueno | 403/1 |
| 4,282,949 | 8/1981 | Kopich et al. | 180/252 |
| 4,405,032 | * 9/1983 | Welschof et al. | 180/259 |
| 4,625,846 | 12/1986 | Gomez | 192/69.41 |
| 4,627,512 | 12/1986 | Clohessy . | |
| 4,632,207 | 12/1986 | Moore . | |
| 4,817,752 | 4/1989 | Lobo et al. | 180/247 |
| 4,960,192 | * 10/1990 | Kurihara | 192/69.41 |
| 5,085,304 | 2/1992 | Barroso . | |
| 5,123,513 | 6/1992 | Petrak . | |
| 5,141,088 | 8/1992 | Kurihara et al. . | |
| 5,148,901 | 9/1992 | Kurihara et al. . | |
| 5,201,237 | * 4/1993 | Berndtson | 192/82 R X |
| 5,219,054 | 6/1993 | Teraoka . | |
| 5,353,890 | * 10/1994 | Clohessy | 180/247 |
| 5,692,590 | * 12/1997 | Iihara et al. | 180/247 X |
| 5,702,162 | * 12/1997 | Pressler | 301/105.1 |
| 5,740,895 | * 4/1998 | Bigley | 192/64.91 |
| 5,984,422 | * 11/1999 | Seifert | 301/105.1 |
| 6,015,361 | 1/2000 | Yamazaki et al. . | |
| 6,082,514 | 7/2000 | Averill . | |
| 6,109,411 | * 8/2000 | Bigley | 192/69.41 |
| 6,170,628 | * 1/2001 | Bigley | 192/69.41 |

* cited by examiner

Primary Examiner—Richard M. Lorence
(74) Attorney, Agent, or Firm—Hahn Loeser + Parks LLP

(57) ABSTRACT

Motor vehicle wheel end assembly with hub lock which includes a wheel bearing and hub assembly attached to a knuckle, shown as a steering knuckle, but not required, pursuant to standard industry practice. A hub trunnion is extended inwardly beyond a wheel bearing cone, is grooved to accept a snap ring retainer and is splined to receive an adapter flange. A constant velocity (CV) joint stub shaft is piloted and retained within a bore in the hub trunnion by utilizing ball bearings and a retaining ring. The outside diameter of the constant velocity (CV) joint body is splined to match the outside diameter of the adapter flange. A locking collar with internal spline teeth is piloted on the constant velocity (CV) joint body and is movable laterally to selectively engage, or not engage, with the adapter flange outside diameter splines. When engaged, torque can be transmitted from the constant velocity (CV) joint to the wheel hub. The locking collar is controlled by a vacuum-operated actuator assembly and an actuator arm assembly. When a vacuum is applied to an internal chamber in the housing, the formed actuator piston and the actuator arm move laterally, and the locking collar is disengaged from the adapter flange. When the vacuum is removed, the springs move the formed actuator piston and actuator arm laterally outboard, and the locking collar is engaged with the adapter flange.

13 Claims, 3 Drawing Sheets

MOTOR VEHICLE WHEEL END ASSEMBLY WITH HUB LOCK

BACKGROUND AND SUMMARY OF THE INVENTION

The present invention relates generally to a new and novel motor vehicle wheel end assembly with hub lock. More particularly, the present invention relates to a motor vehicle wheel end assembly with hub lock for a driving and, in most cases, but not always, a steering axle of a motor vehicle.

The driving and steering axle of a motor vehicle typically includes an axle or shaft which originates from a differential at its inward end and connects to a constant velocity (CV) joint at its outward end. The constant velocity (CV) joint normally includes an inner race which is connected for rotation with the axle shaft to receive torque therefrom and an outer race which receives torque from the inner race at a constant angular velocity through a torque transferring arrangement such as torque transmitting balls. The outer race is generally coupled for rotation with a spindle which is, in turn, coupled for rotation with a wheel hub. The wheel hub is typically supported for rotation by one or more bearing assemblies which are positioned within a bore formed through the knuckle, such as a steering knuckle. The wheel hub generally includes a wheel mounting flange formed in its outward regions to allow a wheel to be mounted thereto and secured for rotation with the wheel hub using a plurality of wheel mounting studs and associated internally threaded wheel mounting lugnuts. A disk brake rotor is also typically secured adjacent to the wheel mounting flange by the wheel mounting studs.

Such prior art motor vehicle wheel end assemblies generally include a variety of components which add to the complexity, weight, cost, ease of assembly and disassembly, and the ease of adjustment of such prior art motor vehicle wheel end assemblies.

A preferred embodiment of the present invention is, therefore, directed to a motor vehicle wheel end assembly with hub lock which includes a wheel bearing and hub assembly attached to a knuckle, shown as a steering knuckle, but not required, pursuant to standard industry practice. A hub trunnion is extended inwardly beyond a wheel bearing cone, is grooved to accept a snap ring retainer and is splined to receive an adapter flange. A constant velocity (CV) joint stub shaft is piloted and retained within a bore in the hub trunnion by utilizing ball bearings and a retaining ring. The outside diameter of the constant velocity (CV) joint body is splined to match the outside diameter of the adapter flange. A locking collar with internal spline teeth is piloted on the constant velocity (CV) joint body and is movable laterally to selectively engage, or not engage, with the adapter flange outside diameter splines. When engaged, torque can be transmitted from the constant velocity (CV) joint to the wheel hub. The locking collar is controlled by a vacuum-operated actuator assembly and an actuator arm assembly. The vacuum-operated actuator assembly consists of a formed actuator housing, a formed actuator piston, three (3) springs, an actuator arm and three (3) collar wear pads. When a vacuum is applied to an internal chamber in the housing, the formed actuator piston and the actuator arm move laterally, and the locking collar is disengaged from the adapter flange. When the vacuum is removed, the springs move the formed actuator piston and actuator arm laterally outboard, and the locking collar is engaged with the adapter flange.

Accordingly, motor vehicle wheel end assemblies with hub locks in accordance with the present invention provide a simple, cost-effective arrangement for a driving axle and in most cases, but not always, a steering axle of a motor vehicle.

Other advantages and novel features of the present invention will become apparent in the following detailed description of the invention when considered in conjunction with the accompanying drawings.

DETAILED DESCRIPTION OF THE DRAWINGS

Figure 3:
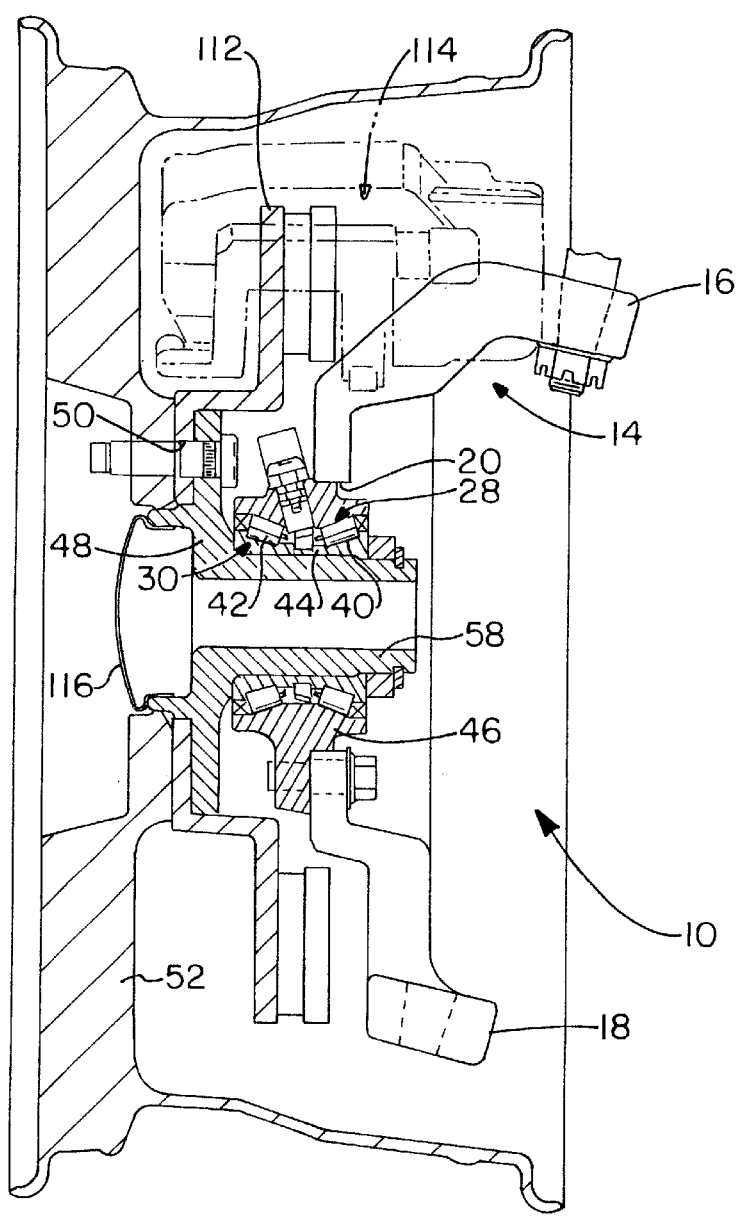
FIG. 3 illustrates a sectional side view, partly in cross-section and partly in plan view, of a motor vehicle wheel end assembly with hub lock in accordance with a second preferred embodiment of the present invention particularly adapted for use in conjunction with a 4×2 motor vehicle drive.
Figure 4:
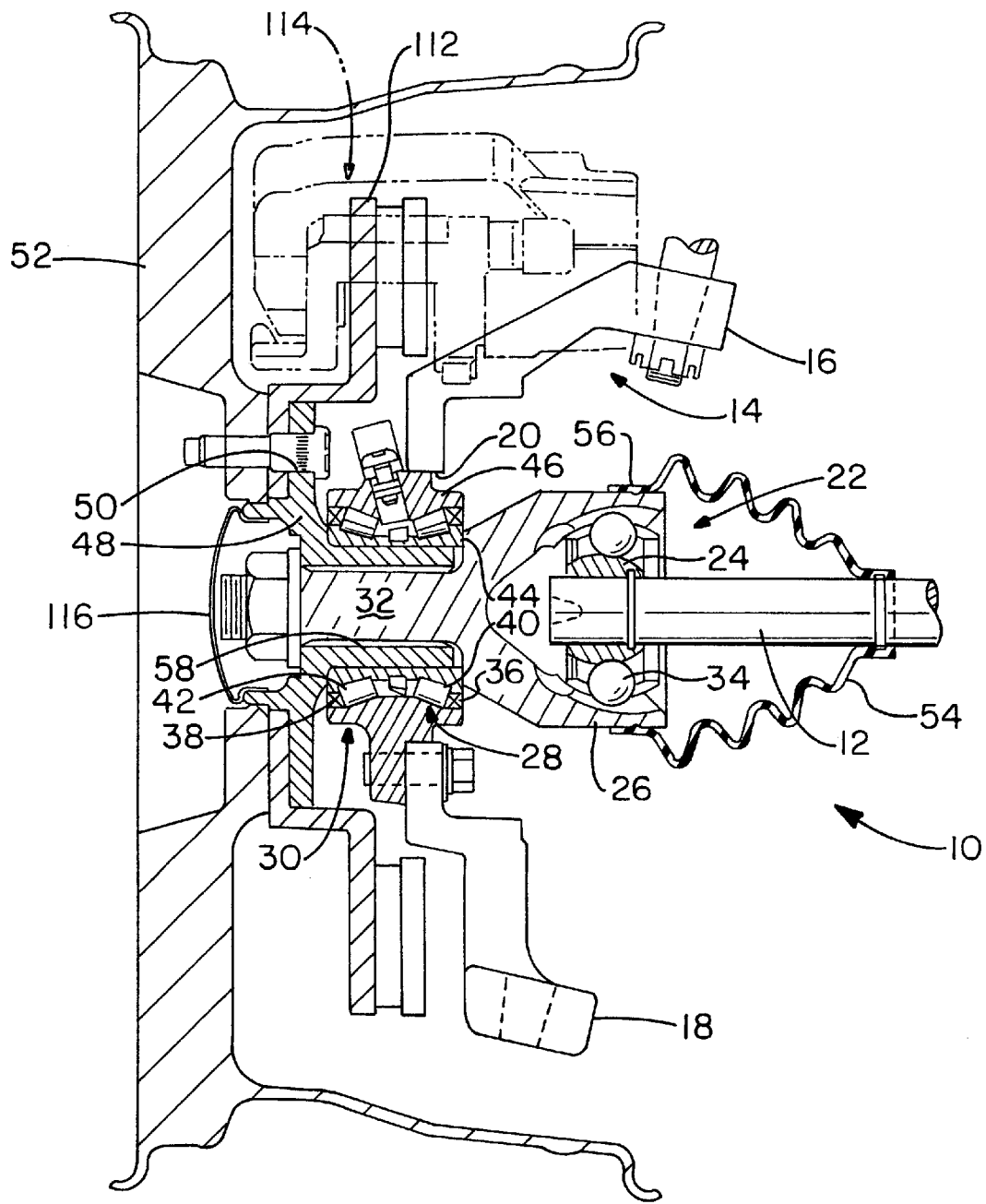
FIG. 4 illustrates a sectional side view, partly in cross-section and partly in plan view, of a motor vehicle wheel end assembly with hub lock in accordance with a third preferred embodiment of the present invention particularly adapted for use in conjunction with an all-wheel motor vehicle drive.

In the following detailed description of a preferred embodiment of the present invention, reference is made to the accompanying drawings which, in conjunction with this detailed description, illustrate and describe preferred embodiments of a motor vehicle wheel end assembly with hub lock in accordance with the present invention. Referring now to the drawings, in which like-referenced characters indicate corresponding elements throughout the several views, attention is first directed to FIGS. 1, 3 and 4, which illustrate a sectional side view, partly in cross-section and partly in plan view, of a motor vehicle wheel end assembly with hub lock, generally identified by reference numeral 10, in accordance with preferred embodiments of the present invention, motor vehicle wheel end assembly with hub lock 10 is designed for use on a driving and, in most cases, but not always, a steering axle of a motor vehicle. Accordingly, motor vehicle wheel end assembly with hub lock 10 would typically be utilized in conjunction with the front axle of a front-wheel drive motor vehicle or in conjunction with the front axle of a four-wheel drive motor vehicle, although its use is not necessarily limited to such environments. The driving and steering axle of a motor vehicle normally includes a differential (not shown) which is positioned between two (2) motor vehicle wheel end assemblies with hub locks 10 for receiving torque from a transaxle or four-wheel drive transfer case (not shown) and for transmitting the torque so received to either or both motor vehicle wheel end assemblies with hub locks 10 through torque transferring axle shaft 12. Torque transferring axle shaft 12 may also be housed within a non-rotating axle tube housing (not shown) if desired.

Motor vehicle wheel end assembly with hub lock 10 generally includes steering knuckle 14 having upper mounting boss 16 and lower mounting boss 18 which allow steering knuckle 14 to be attached to the motor vehicle chassis (not shown). Steering knuckle 14 also includes at least one bore 20 extending therethrough.

Motor vehicle wheel end assembly with hub lock 10 also includes constant velocity (CV) joint, generally indicated by reference numeral 22. Constant velocity (CV) joint 22 generally includes inner member or race 24 which is splined or otherwise drivingly coupled to torque transferring axle shaft 12 and outer member or race 26 which is supported for rotation within inwardly extending substantially cylindrical hub trunnion portion 58 of hub flange mounting member 48 by first ball bearing assembly 68 and second ball bearing assembly 66. Outer member or race 26 includes reduced diameter portion 32 towards its outward end.

Figure 1:
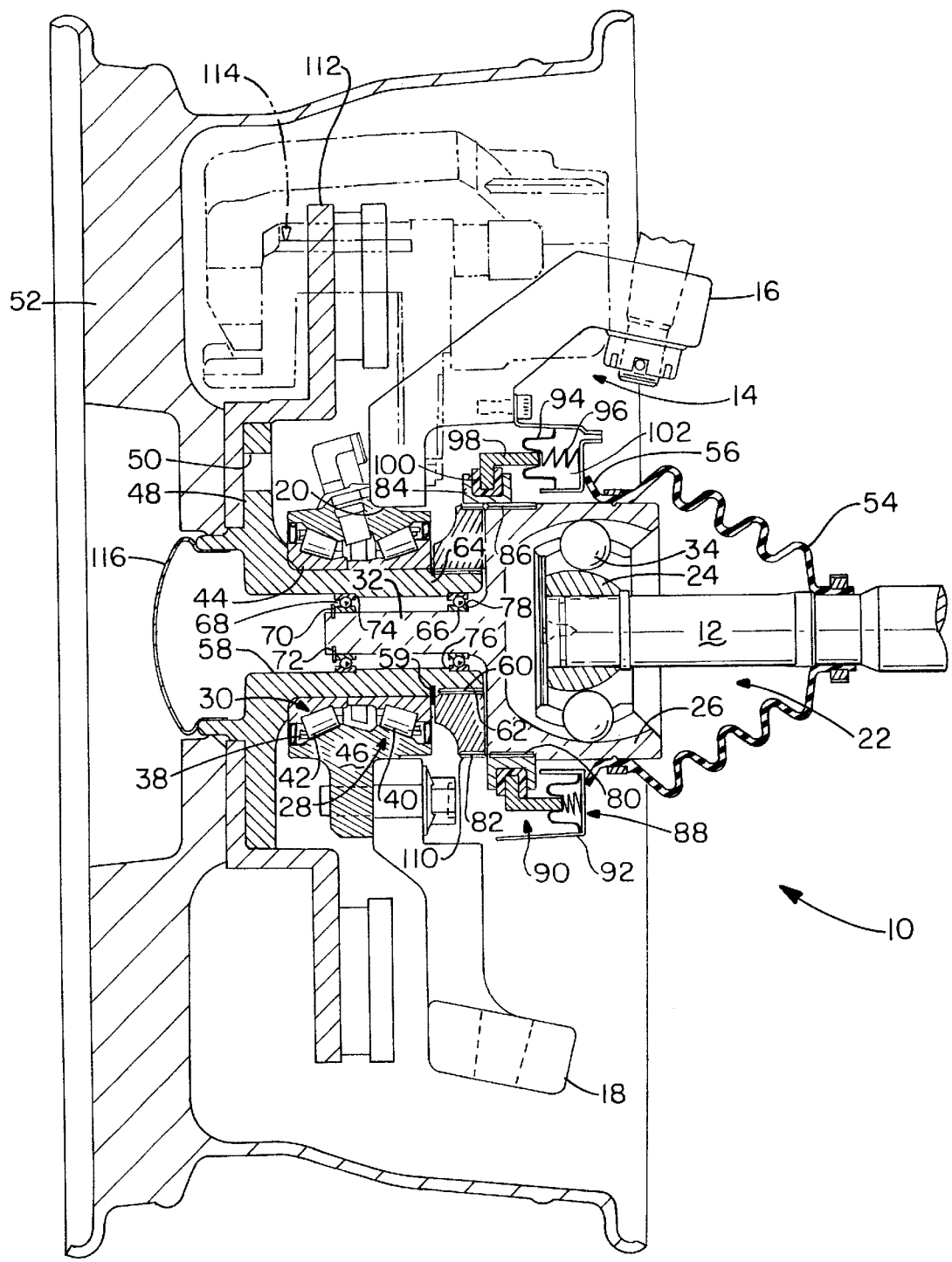
FIG. 1 illustrates a sectional side view, partly in cross-section and partly in plan view, of a motor vehicle wheel end assembly with hub lock in accordance with a first preferred embodiment of the present invention particularly adapted for use in conjunction with a 4×4 motor vehicle drive.

Circumferentially spaced torque transmitting balls 34, of which only two (2) are shown in FIG. 1, are positioned between inner member or race 24 and outer member or race 26. Each circumferentially spaced torque transmitting ball 34 is received within one of a plurality of grooves formed in inner member or race 24 and a cooperating and corresponding one of a plurality of grooves formed in outer member or race 26 so as to transmit torque from inner member or race 24 to outer member or race 26. Circumferentially spaced torque transmitting balls 34 and grooves cooperate such that torque is transferred from inner member or race 24 to outer member or race 26 at a constant angular velocity throughout the range of steering motion of motor vehicle wheel end assembly with hub lock 10. Circumferentially spaced torque transmitting balls 34 are typically retained within grooves in inner member or race 24 and outer member or race 26 by a cage member (not shown). Motor vehicle wheel end assembly with hub lock 10 in accordance with the preferred embodiment of the invention described herein permits constant velocity (CV) joint 22 to be removed from motor vehicle wheel end assembly with hub lock 10 without necessitating removal of steering knuckle 14. It should also be noted that other arrangements for providing a constant angular velocity coupling of inner member or race 24 and outer member or race 26 are known, and this invention is not intended to be limited to any particular arrangement for providing such a constant angular velocity coupling between inner member or race 24 and outer member or race 26.

Constant velocity (CV) joint 22, and more particularly outer member or race 26 thereof, is supported for rotation within bore 20 of steering knuckle 14 by first bearing assembly 28 and second bearing assembly 30. First bearing assembly 28 includes retainer or cage 36 and second bearing assembly 30 includes retainer or cage 38. Retainer or cage 36 and retainer or cage 38 separate and circumferentially space the plurality of bearings 40 and 42, respectively, around first bearing assembly 28 and second bearing assembly 30, respectively. First bearing assembly 28 and second bearing assembly 30 preferably share common inner race 44 and common outer race 46, although separate inner races and outer races for each of first bearing assembly 28 and second bearing assembly 30 could alternatively be used. First bearing assembly 28 and second bearing assembly 30 are preferably unitary bearing assemblies which are piloted on their outside diameters in bore 20 of steering knuckle 14. Bearings 40 of first bearing assembly 28 and bearings 42 of second bearing assembly 30 are preferably tapered roller or cartridge-type bearings, although this invention is not intended to be limited to this or any other type of bearing assembly in particular. For example, ball bearings could be utilized in place of tapered roller or cartridge-type bearings in first bearing assembly 28 and second bearing assembly 30.

With the arrangement of motor vehicle wheel end assembly with hub lock 10 as described herein, during assembly or disassembly of motor vehicle wheel end assembly with hub lock 10, first bearing assembly 28 and second bearing assembly 30 may be piloted on or removed from their position in bore 20 in steering knuckle 14. Thus, if either or both first bearing assembly 28 and/or second bearing assembly 30 need to be replaced, first bearing assembly 28 and second bearing assembly 30 may be removed from bore 20 in steering knuckle 14, discarded and replaced with similar relatively low-cost bearing assemblies. In this manner, first bearing assembly 28 and second bearing assembly 30 may be readily replaced and/or serviced. In addition, by forming common inner race 44 separate from the outside diameter of outer member or race 26 of constant velocity (CV) joint 22 and by forming common outer race 46 separate from the inside diameter of bore 20 in steering knuckle 14, outer member or race 26 of constant velocity (CV) joint 22 and steering knuckle 14 do not need to be fabricated from expensive, high quality, bearing grade steel, as would normally be the case if the outside diameter of outer member or race 26 of constant velocity (CV) joint 22 and the inside diameter of bore 20 in steering knuckle 14 were utilized to interface directly with first bearing assembly 28 and second bearing assembly 30. Furthermore, first bearing assembly 28 and second bearing assembly 30 may be replaced without removing or replacing outer member or race 26 of constant velocity (CV) joint 22 or steering knuckle 14.

Motor vehicle wheel end assembly with hub lock 10 also includes hub flange mounting member 48 having a plurality of holes 50 formed therein. A plurality of wheel mounting studs (shown in FIGS. 3 and 4) are inserted into holes 50 to receive and secure hub flange 52, including a wheel on which a motor vehicle tire (not shown) is mounted thereon, for rotation with hub flange mounting member 48.

Motor vehicle wheel end assembly with hub lock 10 also preferably includes constant velocity (CV) cover or boot 54. Constant velocity (CV) cover or boot 54 is preferably fabricated from a flexible material, such as rubber, and serves to preclude dirt, water and other foreign substances from entering into and interfering with the operation of constant velocity (CV) joint 22. Constant velocity (CV) cover or boot 54 preferably includes integral seal lip 56 which extends outwardly from the side of constant velocity (CV) cover or boot 54 near the outer end of constant velocity (CV) cover or boot 54. Integral seal lip 56 acts as a slinger and assists in protecting against entry of excessive dirt, water and other foreign substances.

Motor vehicle wheel end assembly with hub lock 10 can be readily disassembled for inspection, cleaning, regreasing and/or replacement of first bearing assembly 28 and second bearing assembly 30. Similarly, providing first bearing assembly 28 and second bearing assembly 30 as removable bearing assemblies permits first bearing assembly 28 and second bearing assembly 30 to be easily removed and replaced without replacing any part of constant velocity (CV) joint 22, hub flange mounting member 48 or hub flange 52. Furthermore, as previously discussed, providing first bearing assembly 28 and second bearing assembly 30 as being removable in motor vehicle wheel end assembly with hub lock 10 also allows constant velocity (CV) joint 22, hub flange mounting member 48 and hub flange 52 to be fabricated in a cost effective manner since there is no need to utilize expensive, high-quality bearing grade steel to fabricate these components since first bearing assembly 28 and second bearing assembly 30 do not directly interface with these components.

Hub flange mounting member 48 includes inwardly extending substantially cylindrical hub trunnion portion 58 which extends inwardly beyond first bearing assembly 28 and second bearing assembly 30. The outside diameter of the inward portion of inwardly extending substantially cylindrical hub trunnion portion 58 includes a plurality of splines 60 which engage a corresponding plurality of splines 62 in adapter flange 64, thus causing inwardly extending substantially cylindrical hub trunnion portion 58 and adapter flange 64 to rotate together. Reduced diameter portion 32 of outer member or race 26 of constant velocity (CV) joint 22 is radially supported by first ball bearing assembly 68 and second ball bearing assembly 66 interior of inwardly extending substantially cylindrical hub trunnion portion 58. First ball bearing assembly 68 is outwardly retained by snap ring 70 engaged in outwardly extending snap ring retaining groove 72 in reduced diameter portion 32 of outer member or race 26 of constant velocity (CV) joint 22 and is inwardly retained by shoulder 74 on the inside diameter of inwardly extending substantially cylindrical hub trunnion portion 58. Similarly, second ball bearing assembly 66 is outwardly retained by shoulder 76 on the inside diameter of inwardly extending substantially cylindrical hub trunnion portion 58 and is inwardly retained by shoulder 78 in reduced diameter portion 32 of outer member or race 26 of constant velocity (CV) joint 22.

The outside diameter of outer member or race 26 of constant velocity (CV) joint 22 includes a plurality of splines 80 which match a corresponding plurality of splines 82 on the outside diameter of adapter flange 64. Locking collar 84 includes a plurality of splines 86 on its inside diameter which correspond to and are selectively engageable with the plurality of splines 80 on the outside diameter of outer member or race 26 of constant velocity (CV) joint 22 and the corresponding plurality of splines 82 on the outside diameter of adapter flange 64. Locking collar 84 is movable laterally to selectively engage, or not engage, corresponding plurality of splines 82 on the outside diameter of adapter flange 64. When locking collar 84 is engaged with the corresponding plurality of splines 82 on the outside diameter of adapter flange 64, torque is transmitted from constant velocity (CV) joint 22 to hub flange mounting member 48. Lateral movement of locking collar 84 is controlled by vacuum-operated actuator assembly 88 and actuator arm assembly 90. Vacuum-operated actuator assembly 88 includes formed actuator housing 92, formed actuator piston 94, three (3) springs 96, only two (2) of which are shown in FIG. 1, actuator arm 98 and three (3) collar wear pads 100.

In operation, torque transferring axle shaft 12 receives torque from a differential (not shown). Inner member or race 24 of constant velocity (CV) joint 22 receives this torque from torque transferring axle shaft 12 through a splined connection or otherwise and transmits this torque through circumferentially spaced torque transmitting balls 34 to outer member or race 26 of constant velocity (CV) joint 22. Outer member or race 26 of constant velocity (CV) joint 22 transfers the torque to hub flange mounting member 48. Hub flange mounting member 48 then transfers the torque to wheel mounting studs (not shown) and then through a bolted connection to hub flange 52, including a wheel and a motor vehicle tire (not shown) mounted thereon.

When a vacuum is applied in internal chamber 102 of formed actuator housing 92, formed actuator piston 94 and actuator arm 98 move laterally inboard, as shown in the bottom half of FIG. 1, and the plurality of splines 86 on locking collar 84 are disengaged from the plurality of splines 82 in adapter flange 64. When the vacuum is removed from internal chamber 102 of formed actuator housing 92, springs 96 move formed actuator piston 94 and actuator arm 98 laterally outboard, as shown in the top half of FIG. 1, and the plurality of splines 86 on locking collar 84 are engaged with the plurality of splines 82 in adapter flange 64 and locking collar 84 and adapter flange 64 rotate together.

Figure 2:
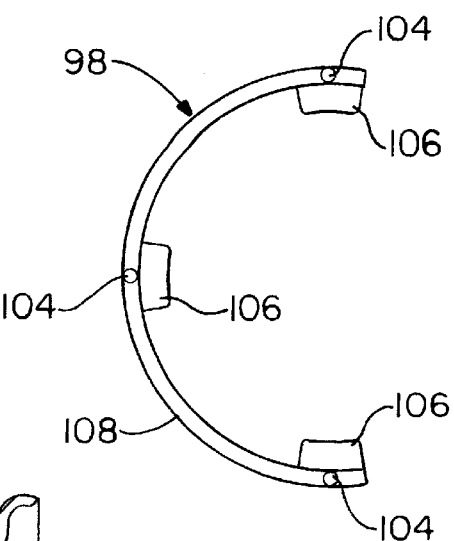
FIG. 2 illustrates a side view of an actuator arm used in conjunction with the preferred embodiment of a motor vehicle wheel end assembly with hub lock shown in FIG. 1.

Referring now to FIG. 2, actuator arm 98 includes three (3) mounting studs 104 for attaching actuator arm 98 to formed actuator piston 94, three (3) adapter studs 106 for mounting collar wear pads 100 and collar segment 108 which extends substantially 180° to facilitate actuator arm 98 to locking collar 84 assembly. Mounting studs 104 are secured to formed actuator piston 94, preferably by press fit. Collar wear pads 100 are fabricated from a polymer material and are secured to adapter studs 106 by a retaining lip (not shown) fit in which the inside diameter of collar wear pads 100 are resiliently expanded over adaptor studs 106 and a retaining lip (not shown) thereon snaps into and engages a groove (not shown) in the outside diameter of adaptor studs 106. This retaining lip (not shown) fit is similar to that currently used for axle disconnect wear pads. Actuator arm 98 is designed to mate with locking collar 84 from the side to facilitate assembly. A three-point contact is used to maintain formed actuator piston 94 alignment in formed actuator housing 92 and to prevent binding due to misalignment during actuation.

To minimize contamination of inboard bearing seal (not shown), locking collar 84, splines 80, 82, 86 and formed actuator piston 94 seal surfaces, formed actuator housing 92 is designed as an enclosure. Formed actuator housing 92 is flange mounted to the inboard side of steering knuckle 14 and the bottom of formed actuator housing 92 is preferably vented to permit drainage of any moisture which might accumulate therein. Constant velocity (CV) cover or boot 54 preferably includes integral seal lip 56 to preclude external contamination from entering into the opening present between formed actuator housing 92 and constant velocity (CV) joint 22.

To facilitate assembly of formed actuator piston 94 into formed actuator housing 92, formed actuator housing 92 is designed with both outside diameter and insider diameter lead-in chamfers. These chamfers prevent potential formed actuator piston 94 seal lip damage due to improper formed actuator piston 94 to formed actuator housing 92 alignment during assembly.

Motor vehicle wheel end assembly with hub lock 10 includes a redundant safety feature. In many prior art motor vehicle with hub lock designs, if the hub and/or retaining ring should fail, the hub could potentially move outboard, resulting in loss of the wheel. In motor vehicle wheel end assembly with hub lock 10 in accordance with the present invention, the design of constant velocity (CV) joint 22 would preclude such wheel separation from occurring in that as hub flange 52 is moved outboard, outer member or race 26 of constant velocity (CV) joint 22 would contact adapter flange 64, first bearing assembly 28 and second bearing assembly 30. This contact would preclude hub flange 52 from moving further outboard.

It should be noted that motor vehicle wheel end assembly with hub lock 10 in accordance with the present invention provides several advantages over known prior art motor vehicle wheel end assemblies with hub locks. For example, adapter flange 64 is used to transfer torque from outer member or race 26 of constant velocity (CV) joint 22 to hub flange mounting member 48. Adapter flange 64 is a simple circular component, including plurality of splines 62 on the inside diameter and plurality of splines 82 on the outside diameter and having integral outside diameter stop or shoulder 110 to preclude over-run of locking collar 84 when engaged. Also, outer member or race 26 of constant velocity (CV) joint 22 includes plurality of splines 80, which are preferably net-formed, on the outside diameter of outer member or race 26 of constant velocity (CV) joint 22 to selectively engage, or not engage, with plurality of splines 86 on locking collar 84. Constant velocity (CV) cover or boot 54 includes integral seal lip 56 which functions as a seal. In addition, formed actuator piston 94, a piston-type actuator, rather than a diaphragm, is used to provide sufficient locking collar 84 travel for engagement between plurality of splines 82 in adapter flange 64 and plurality of splines 86 in locking collar 84. Formed actuator housing 92 is designed as an enclosure to protect first bearing assembly 28, second bearing assembly 30, locking collar 84, splines 80, 82, 86 and formed actuator piston 94 from external contamination by water spray, thrown gravel, etc. and includes a lead-in pilot chamfer at the inside diameter and the outside diameter to facilitate installation of formed actuator piston 94. Furthermore, actuator arm 98 has a 180° degree three-point contact design to balance loading and facilitate assembly. Formed actuator piston 94 includes integral seals on the inside diameter and the outside diameter, integral actuator arm 98 mounting and integral engagement spring 96 piloting. Also, the overall design includes a unique safety feature in that if snap ring 59 which retains hub flange mounting member 48 to first bearing assembly 28 and second bearing assembly 30 should fail, outer member or race 26 of constant velocity (CV) joint 22 will contact adapter flange 64, first bearing assembly 28 and second bearing assembly 30, thus precluding wheel end separation. Motor vehicle wheel end assembly with hub lock 10 is adaptable for four-wheel, two-wheel and all-wheel drive applications using a common knuckle, such as steering knuckle 14, wheel bearings, such as first bearing assembly 28 and second bearing assembly 30, brake rotor 112, brake caliper 114, hubcap 116 and hub flange 52.

Although the present invention has been described above in detail, the same is by way of illustration and example only and is not to be taken as a limitation on the present invention. For example, as previously discussed, various types of bearing assemblies could be readily utilized in conjunction with the motor vehicle wheel end assembly in accordance with the present invention. Accordingly, the scope and content of the present invention are to be defined only by the terms of the appended claims.

What is claimed is:

1. A wheel end assembly with hub lock for a driving axle of a motor vehicle, said wheel end assembly with hub lock comprising:

a knuckle including a bore formed therethrough;

a constant velocity (CV) joint having an inner member or race capable of being drivingly coupled for rotation with an axle shaft to receive torque therefrom and an outer member or race drivingly coupled to said inner member or race, said outer member or race of said constant velocity (CV) joint including a reduced diameter portion and a plurality of splines on an outside diameter thereof;

a hub flange mounting member including an inwardly extending substantially cylindrical hub trunnion portion having a hollow portion and a plurality of splines on an outside diameter thereof, said reduced diameter portion of said outer member or race being supported for rotation by at least one bearing assembly within said hollow portion of said inwardly extending substantially cylindrical hub trunnion portion of said hub flange mounting member which, in turn, is supported for rotation within said bore of said knuckle by at least one bearing assembly;

an adaptor flange having a plurality of splines corresponding to said plurality of splines on said outside diameter of said inwardly extending substantially cylindrical hub trunnion portion of said hub flange mounting member on an inside diameter thereof, said adaptor flange also including a plurality of splines on an outside diameter thereof; and a locking collar having a plurality of splines corresponding to said plurality of splines on said outside diameter of said outer member or race of said constant velocity (CV) joint and to said plurality of splines on said outside diameter of said adaptor flange on an inside diameter thereof, said locking collar being laterally movable to selectively engage, or not engage, with said plurality of splines on said outside diameter of said adaptor flange and transmit, or not transmit, torque from said constant velocity (CV) joint to said hub flange mounting member.

2. The wheel end assembly with hub lock in accordance with claim 1, wherein said knuckle is a steering knuckle.

3. The wheel end assembly with hub lock in accordance with claim 1, wherein said lateral movement of said locking collar is controlled by a vacuum-operated actuator assembly and an actuator arm assembly.

4. The wheel end assembly with hub lock in accordance with claim 3, wherein said vacuum-operated actuator assembly includes an actuator piston which controls said lateral movement of said locking collar.

5. The wheel end assembly with hub lock in accordance with claim 3, wherein said vacuum-operated actuator assembly includes an enclosed actuator housing, an actuator piston, at least one (1) return spring and at least one (1) wear pad to control said lateral movement of said locking collar.

6. The wheel end assembly with hub lock in accordance with claim 3, wherein said adaptor flange includes an integral stop or shoulder on its outside diameter to preclude over-run of said locking collar when engaged.

7. The wheel end assembly with hub lock in accordance with claim 3, wherein said actuator arm assembly includes a collar segment which extends substantially 180° to provide three-point contact to balance loading and facilitate assembly.

8. A wheel end assembly with hub lock for a driving and steering axle of a motor vehicle, said wheel end assembly with hub lock comprising:

a steering knuckle including a bore formed therethrough;

a constant velocity (CV) joint having an inner member or race capable of being drivingly coupled for rotation with an axle shaft to receive torque therefrom and an outer member or race drivingly coupled to said inner member or race, said outer member or race of said constant velocity (CV) joint including a reduced diameter portion and a plurality of splines on an outside diameter thereof;

a hub flange mounting member including an inwardly extending substantially cylindrical hub trunnion portion having a hollow portion and a plurality of splines on an outside diameter thereof, said reduced diameter portion of said outer member or race being supported for rotation by at least one bearing assembly within said hollow portion of said inwardly extending substantially cylindrical hub trunnion portion of said hub flange mounting member which, in turn, is supported for rotation within said bore of said knuckle by at least one bearing assembly;

an adaptor flange having a plurality of splines corresponding to said plurality of splines on said outside diameter of said substantially cylindrical hub trunnion portion of said hub flange mounting member on an inside diameter thereof, said adaptor flange also including a plurality of splines on an outside diameter thereof; and a locking collar having a plurality of splines corresponding to said plurality of splines on said outside diameter of said outer member or race of said constant velocity (CV) joint and to said plurality of splines on said outside diameter of said adaptor flange on an inside diameter thereof, said locking collar being laterally movable by a piston-type actuator in a first direction to selectively not engage with said plurality of splines on said outside diameter of said adaptor flange and by a return spring in a second direction to selectively engage with said plurality of splines on said outside diameter of said adaptor flange and transmit torque from said constant velocity (CV) joint to said hub flange mounting member.

9. The wheel end assembly with hub lock in accordance with claim 8, wherein said lateral movement of said locking collar is controlled by a vacuum-operated actuator assembly and an actuator arm assembly.

10. The wheel end assembly with hub lock in accordance with claim 9, wherein said vacuum-operated actuator assembly includes a formed actuator piston enclosed in a formed actuator housing to control said lateral movement of said locking collar.

11. The wheel end assembly with hub lock in accordance with claim 9, wherein said vacuum-operated actuator assembly includes an enclosed formed actuator housing, a formed actuator piston, at least one (1) return spring and at least one (1) wear pad to control said lateral movement of said locking collar.

12. The wheel end assembly with hub lock in accordance with claim 11, wherein said adaptor flange includes an integral stop or shoulder on its outside diameter to preclude over-run of said locking collar when engaged.

13. The wheel end assembly with hub lock in accordance with claim 12, wherein said actuator arm assembly includes a collar segment which extends substantially 180° to provide three-point contact to balance loading and facilitate assembly.

\* \* \* \* \*